United States Patent [19]

Youcheff et al.

[11] Patent Number: 5,085,877
[45] Date of Patent: Feb. 4, 1992

[54] COMPOSITION AND METHOD FOR IMPROVING ADHERENCE OF FAT-BASED COATINGS TO FROZEN FAT-BASED CONFECTIONS

[75] Inventors: Gary G. Youcheff, Maytown; Stephen M. Wodke, Lancaster; Douglas W. Perkins, Mount Joy, all of Pa.

[73] Assignee: Mars, Incorporated, McLean, Va.

[21] Appl. No.: 626,387

[22] Filed: Dec. 12, 1990

Related U.S. Application Data

[63] Continuation of Ser. No. 392,104, Aug. 10, 1989, abandoned.

[51] Int. Cl.$^5$ ............................................. A23G 9/00
[52] U.S. Cl. ...................................... 426/100; 426/89; 426/302; 426/306; 426/307
[58] Field of Search ................. 426/302, 303, 306, 307, 426/89, 100, 101

[56] References Cited

U.S. PATENT DOCUMENTS 1,901,394  3/1923  Hassell et al. .................. 426/307
4,643,894  2/1987  Porter et al. .................... 106/210
4,738,865  4/1988  Morris ............................ 426/103

FOREIGN PATENT DOCUMENTS 0766025 10/1971 Belgium .............................. 426/100

OTHER PUBLICATIONS

"Corn Syrups and Sugars", Corn Industries Research Foundation, Inc., Washington, D.C. 1958, p. 15.

Primary Examiner—Donald E. Czaja
Assistant Examiner—Anthony J. Weier
Attorney, Agent, or Firm—Curtis, Morris & Safford

[57] ABSTRACT

The adherence of coatings to frozen fat-based confections can be improved by applying a composition which includes a polysaccharide and a suitable carrier as an interface layer between a frozen fat-based confection and a coating.

9 Claims, 1 Drawing Sheet

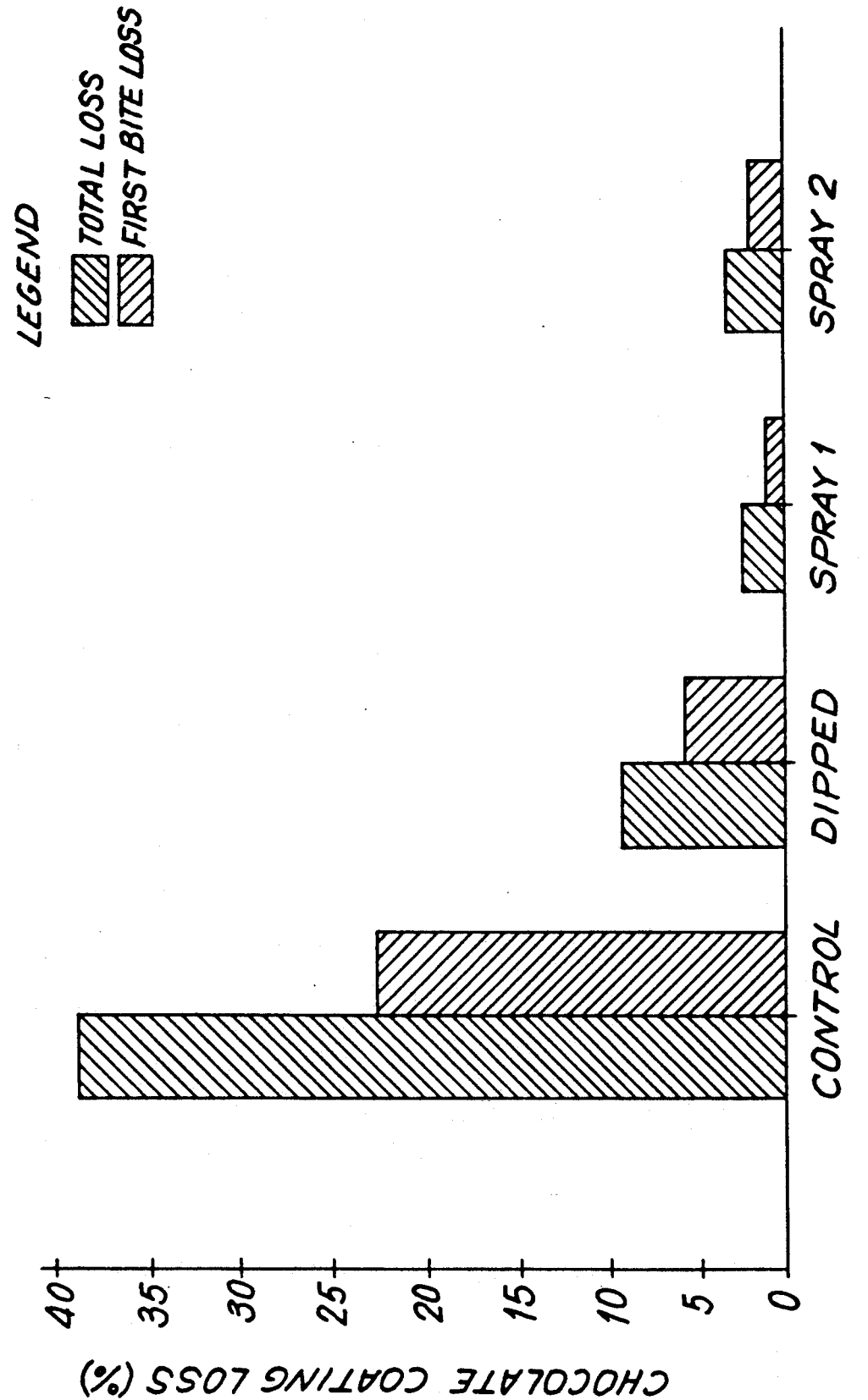

COMPOSITION AND METHOD FOR IMPROVING ADHERENCE OF FAT-BASED COATINGS TO FROZEN FAT-BASED CONFECTIONS

This is a continuation of application Ser. No. 392,104, filed Aug. 10, 1989.

FIELD OF THE INVENTION

This invention relates to the production of frozen or low temperature confections or food products such as frozen fat-based desserts which are covered with edible coatings. The primary object of the invention is to provide an improved coating for confections or food products of this type, or especially for ice cream bars or other bodies or articles made of ice cream or like compounds requiring low temperature storage.

BACKGROUND OF THE INVENTION

In general, the coatings used for frozen fat-based desserts such as ice cream bars have been composed of a fat-containing substance. The coating material is melted and the frozen desserts are dipped into or otherwise coated with a liquified coating such as by spraying or enrobing with the liquified coating. The fat of the coating congeals on contact with the frozen desserts so that coatings are formed over the frozen desserts.

Coatings composed of fat-containing substances are often fragile and brittle, particularly when cold. When the confection is eaten, the coating will crack or flake off over a relatively large area often creating not only a mess but preventing the person eating the confection from enjoying the entire dessert. Additionally, after the coating has fallen off, the core leaks out on softening. It is to these problems that the present invention is addressed.

Various coatings for low temperature or frozen confections have been used in the past. For example, U.S. Pat. No. 2,133,586 discloses the use of dextrose in a dry or crystalline state and, in part at least, anhydrous dextrose to improve the adherence of an ice cream coating. This is one of the earlier patents to address the problem of improving ice cream coating adhesion. U.S. Pat. No. 2,191,352 discloses an edible coating for frozen confections (e.g., chocolate coating over an ice cream core) which is intended to be flexible and tender to the touch or bite, colored and flavored to taste, and capable of bonding to the core which it surrounds. The coating, which employs gelatin, reduces cracking and flaking off when bitten into. U.S. Pat. Nos. 4,560,563 and 4,396,633 disclose the modification of the fat component of ice cream coatings as a means of improving "the tendency to break, flake, or rub off during production or consumption".

All these references relate to various attempts to address the problem of improving ice cream coating adhesion. These references use dry or crystalline and anhydrous dextrose, a modification of the fat component of ice cream coatings, or gelatin to improve the coating. None of these attempts have resulted in satisfactorily improving the adhesion of fat-containing coatings to frozen fat-based confections without undesirably affecting the quality, taste, texture and/or appearance of the final product.

OBJECTS OF THE INVENTION

It is therefore a primary object of this invention to improve the adhesion of fat-containing coatings to frozen fat-based confections.

It is another object of the invention to improve the adhesion of coatings to frozen fat-based confections without changing a consumer's perception of the quality, taste, texture and/or appearance of the coating or final product.

SUMMARY OF THE INVENTION

This invention relates in particular to the use of an interface layer between a fat-based coating and a frozen fat-based confection. This layer improves the adhesion of the fat-based coating to the frozen fat-based confection. In addition, this layer does not affect the overall characteristics of the final product. When the coating itself is altered so that the coating is not susceptible to massive cracking, the overall product undergoes unacceptable flavor and textural changes. It has been discovered that instead of changing the composition of the coating, improved results are achieved with an interface layer between the coating and the confection.

More particularly, the interface layer comprises a polysaccharide and a carrier, with or without flavors and colors. This interface layer is applied by any standard method in the food industry including dipping, spraying (atomized and non-atomized), enrobing and dry or dusting application. The coating of the finished product is less susceptible to multiple cracking. Additionally, the resultant adhesion between the confection and the interface layer, and between the interface layer and the coating greatly reduces the potential for the drop-off of the coating during the eating process.

DETAILED DESCRIPTION OF THE INVENTION

This invention relates to the production of frozen or low temperature confections or food products such as frozen fat-based desserts which are covered with edible coatings. The invention also relates to coated confections of the kind having a core or center of a frozen fat-based dessert such as ice cream, or the like. The inventors have discovered that a quantitative improvement in the adhesion of fat-based coatings to fat-based confections can be demonstrated by employing a particular composition as an interface layer between the fat-based coating and the fat-based confection.

The use of this interface layer between the coating and the confection does not affect the quality, taste, texture and/or appearance of the overall product.

The interface layer comprises a polysaccharide and a carrier, with or without flavors and colors. The preferred carrier is water. The characteristics of the polysaccharide are that it can form, in an aqueous solution, a thin film which is undetectable when eating; it is bland or tasteless; it is white or colorless; and its solubility is high and viscosity low so it can be applied easily to the product.

Various polysaccharide interface layers have been found to enhance the adherence of coatings to frozen fat-based confections. Among the polysaccharides employed were hydrolyzed starches which were evaluated by varying the dextrose equivalent ("DE"). Hydrolyzed starches having a DE as high as approximately 65 were found to enhance the adherence of the coatings. More particularly, hydrolyzed starches having a DE not exceeding approximately 45 were found to further enhance the adherence of the coatings. Hydrolyzed starches having a DE not exceeding approximately 25 were found to give the most improvement. Because some hydrolyzed starches are acceptable from the standpoint of improving adhesion, but also contribute sweetness to the final product, a preferred hydrolyzed starch is maltodextrin, a nonsweet nutritive saccharide polymer that consists of D-glucose units linked primarily by α-1-4 bonds and that has a DE of less than 20. Maltodextrin with a DE as low as approximately 5 was found to improve the adherence of the coatings. A particularly preferred hydrolyzed starch is maltodextrin with a DE of 10.

The interface layer can be applied to the frozen fat-based confection core by conventional methods known in the food industry. Examples of such methods include dipping, spraying (atomized spraying and non-atomized spraying), enrobing and dusting. These same methods are then used to apply the fat-based coating over the interface layer. It has been found that a preferred method of applying the interface layer to the frozen fat-based dessert, from both a retention and a processing standpoint, is by atomized spraying.

In general, it has been found that the adherence of any fat-based coating, including pastels, can be improved with an interface layer in accordance with the teachings of this invention. A particularly preferred coating is chocolate. Fat-based coatings for use in accordance with the teachings of this invention typically have a thickness of 0.25 to 10 millimeters, and particularly 0.5 to 4 millimeters.

The solids concentration of the interface layer is effective over a wide range. The dry concentration was tested as high as approximately 0.2 mg polysaccharide/mm$^2$ on the surface of the frozen fat-based confection and as low as approximately about 0.006 mg/mm$^2$. Particularly good results are achieved when the concentration of the interface layer is about 0.07 mg/mm$^2$. Likewise, when in solution, a concentration as high as about 41 parts polysaccharides in 59 parts water solids was found to be effective. A concentration of about 33 parts polysaccharide in 69 parts water solids was found to be particularly effective. A concentration as low as about 15 parts polysaccharide in 85 parts water was also found to be effective.

Additionally, while the thickness of the interface layer can vary greatly depending upon the particular application, it has generally been found that the preferred thickness is 0.1 millimeters.

DESCRIPTION OF A PREFERRED EMBODIMENT

A frozen fat-based confection was prepared having an ice cream core or center, an interface layer and a chocolate coating. The interface layer comprised maltodextrin having a DE of 10 prepared as a solution of 33.3 parts maltodextrin in 66.7 parts water solids in water, which solution was pasteurized.

The ice cream center was approximately 69 millimeters wide, by 70 millimeters long, by 21½ millimeters thick.

The temperature of the ice cream at the time the maltodextrin solution was applied was −10° F., and the temperature of the maltodextrin solution was approximately 1° C. The maltodextrin solution was applied by atomized spraying onto the ice cream center. The spraying continued until the surface area of the ice cream was covered. The total interface layer weight was about 2½ grams, and the thickness of the layer was about 0.1 millimeters.

This product was then dipped into the chocolate coating at about 100° F., and the coating was solidified by passing the product through a cooling tunnel at approximately −20° F. The resultant coating weighed about 30 grams, and was approximately 2 millimeters thick. The entire product was stored under normal conditions at approximately −20° F.

Little or no change was detected in the quality, taste, texture and/or appearance of this final product compared to a product with no interface layer.

Certain aspects of the invention are further described in FIG. 1. FIG. 1 is a bar graph depicting a comparison between the average dark chocolate coating loss from samples with no interface layer (labeled control) and samples with a pasteurized interface layer applied to ice cream centers by dipping and spraying. The sprayed samples were sprayed using two different nozzle configurations (represented as Spray 1 and Spray 2). The different nozzle configurations effect the particle size of the spray, with Spray 1 having the smaller particle size.

There were 82 control products, 67 dipped products, 40 Spray 1 products and 30 Spray 2 products.

All test and control samples were hand dipped into dark chocolate coating.

All dipped and sprayed samples had an interface layer of about 33.3 parts 10 DE maltodextrin in 67 parts water, weighing about 3.5 to 4.0 grams on the dipped samples and about 1.5 to 2.5 grams on the sprayed samples. The interface layer was approximately 0.2 millimeters thick for the dipped samples and approximately 0.1 millimeter thick for the sprayed samples. The thickness of the coating was between 1.6 and 2.0 millimeters.

The percent coating loss was determined using a mechanical device whereby controlled pressure was applied to the sample to simulate the bite plane and force which would be applied on biting. The resultant cracking pattern was analyzed and the coating loss measured.

In the figure, "first bite loss" relates to initial coating loss from cracking and falling off when the first bite is taken from the sample. "Total loss" relates to the overall coating loss that occurs during the entire time the sample is being eaten. As can be seen in the figure, coating loss in the dipped and sprayed samples were significantly improved over the control. The first bite loss in the control was approximately 23% and the total loss was approximately 38%. In the dipped product, the first bite loss was only approximately 7% and the total loss was only approximately 9%. In Spray 1, the first bite loss was only approximately 1% and total loss was only approximately 3%. In Spray 2, first bite loss was only approximately 2% and total loss was only approximately 4%.

The use of the maltodextrin interface layer resulted in a dramatic alteration of the cracking pattern of the fat coating compared to the cracking pattern when no interface layer was employed. An absence of extensive radial and progressive cracking in the test samples was detected which it is believed greatly reduces the potential for coating loss upon biting.

The results show that both sprayed and dipped test samples significantly reduce the potential for coating loss on biting over the control which had no interface layer.

Although an illustrative embodiment of the invention has been described herein, it is to be understood that the invention is not limited to the foregoing, and that various modifications and changes may be effected therein by one skilled in the art without departing from the scope or spirit of the invention as defined in the appended claims.

What is claimed is:

1. A method for enhancing the adherence of a coating to a frozen fat-based confection comprising applying a composition to the surface of a frozen fat-based confection as an interface layer between said frozen fat-based confection and said coating, said composition comprising an effective amount of maltodextrin, in an aqueous solution, to enhance the adherence of said coating to said frozen fat-based confection without substantially affecting the taste and texture of said frozen fat-based confection.

2. The method according to claim 1 wherein the maltodextrin has a dextrose equivalent of 10.

3. The method according to claim 1 wherein the maltodextrin in an aqueous solution is about 33.3 parts maltodextrin in 66.7 parts water, and wherein the solution is a pasteurized solution.

4. The method according to claim 1 wherein the concentration of the maltodextrin in an aqueous solution is in the range of from approximately 15 to approximately 41 parts maltodextrin in approximately 85 to approximately 59 parts water.

5. A frozen fat-based confection comprising a frozen fat-based dessert core, a fat-based coating outer layer, and an effective amount of maltodextrin in an aqueous solution as an interface layer between said frozen fat-based dessert core and said fat-based coating to enhance the adherence of said fat-based coating to said frozen fat-based dessert core without substantially affecting the taste and texture of said frozen fat-based confection.

6. The frozen fat-based confection according to claim 5 wherein the maltodextrin has a dextrose equivalent of 10.

7. The frozen fat-based confection according to claim 5 wherein the maltodextrin in aqueous solution is about 33.3 parts maltodextrin in about 66.7 parts water, and wherein the solution is a pasteurized solution.

8. The frozen fat-based confection according to claim 7 wherein said fat-based core is ice cream and is approximately 69 millimeters wide, 70 millimeters long and 21½ millimeters thick, the interface layer is approximately 0.1 millimeter thick and the coating is chocolate and is approximately 2 millimeters thick.

9. The frozen fat-based confection according to claim 5 wherein the concentration of the maltodextrin in an aqueous solution is in the range of from approximately 15 to approximately 41 parts maltodextrin in approximately 85 to approximately 59 parts water.

* * * * *